Feb. 20, 1962   E. E. HEWITT   3,022,116
SINGLE PIPE BRAKE CONTROL SYSTEM FOR AUTOMOTIVE TRAILERS
Filed May 27, 1959
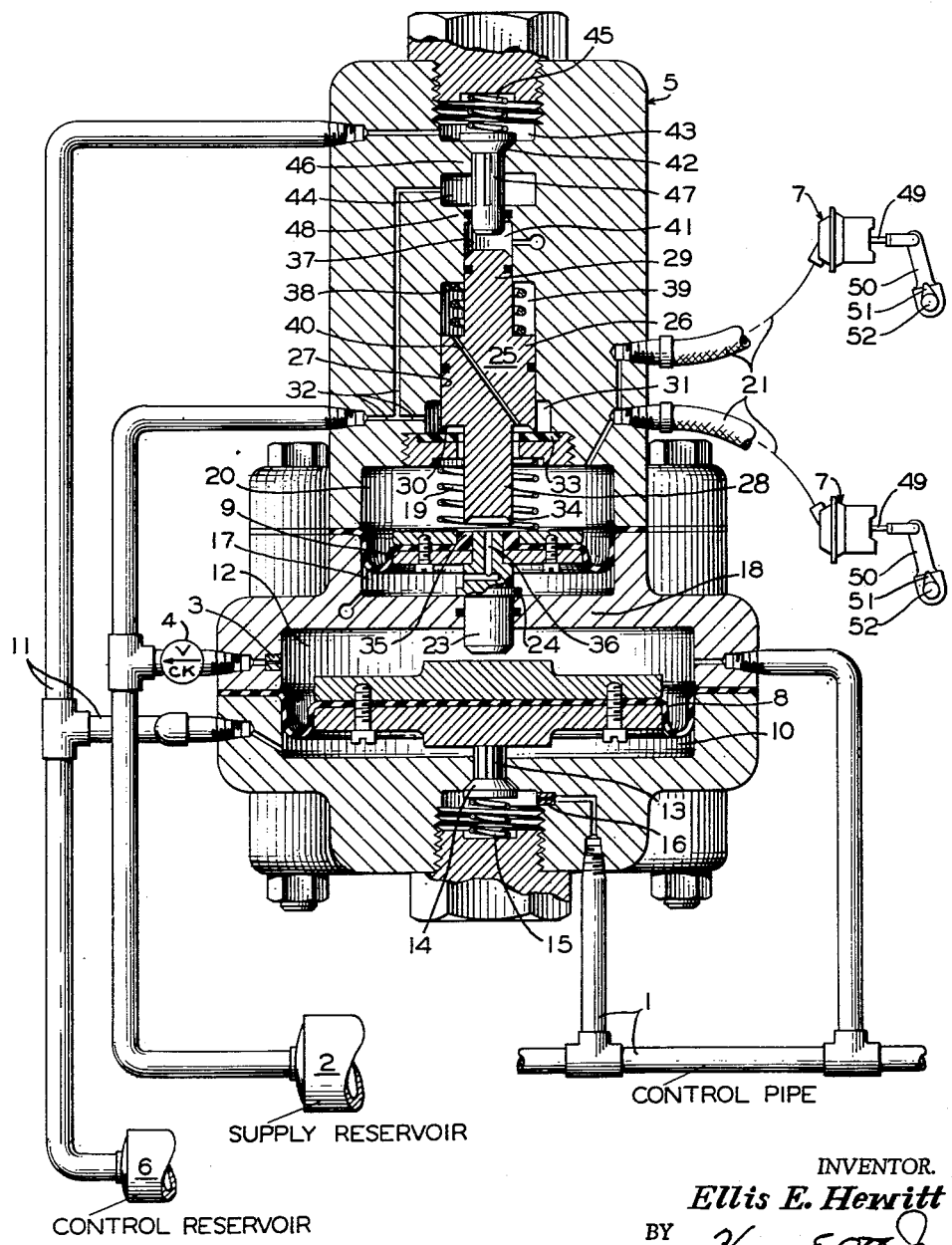
SUPPLY RESERVOIR
CONTROL RESERVOIR
CONTROL PIPE
INVENTOR.
*Ellis E. Hewitt*
BY *Henry E. Otts*
*Attorney*

United States Patent Office 3,022,116
Patented Feb. 20, 1962

3,022,116
SINGLE PIPE BRAKE CONTROL SYSTEM
FOR AUTOMOTIVE TRAILERS
Ellis E. Hewitt, Ruffsdale, Pa., assignor to Westinghouse
Air Brake Company, Wilmerding, Pa., a corporation
of Pennsylvania
Filed May 27, 1959, Ser. No. 816,195
12 Claims. (Cl. 303—28)

This invention relates to fluid pressure brake control systems and more particularly to an improved system of the above type especially suitable for controlling fluid pressure brakes on automotive trailers.

Brake control systems currently used on automotive trailers are of the two-pipe type comprising a service pipe and a fluid pressure supply pipe both extending from the tractor to the trailer. On the trailer are provided a supply reservoir charged via a check valve from the supply pipe; a relay valve device normally operative to provide in a plurality of brake actuators fluid at the pressure of fluid provided in the service pipe, in which pressure is increased to effect a service application of brakes and reduced to effect a release of such application; and an emergency valve device subject to supply reservoir pressure and brake actuator pressure acting in opposition to supply pipe pressure and responsive to venting of the supply pipe, due such as to pull apart of the tractor and trailer, to connect the supply reservoir to the brake actuators in bypass of the relay valve device to effect an emergency application of brakes and also close a normally open connection between the relay valve device and actuators for preventing leakage of pressure fluid from the actuators to atmosphere via the relay valve device.

The principal object of this invention is to provide an improved and simplified fluid pressure brake control system comprising only one brake control pipe (hereinafter referred to as a "control pipe") connecting the trailer with the tractor, and which control pipe serves as both a brake control pipe and a reservoir supply pipe. The improved system also comprises a single brake controlling valve device operative to effect a service application of trailer brakes of a degree corresponding to the extent control pipe pressure is reduced below a normal charge value under control of an operator on the tractor, and effect an emergency application of brakes upon venting of the control pipe due such as to pull apart of the tractor and trailer.

Another object is to provide a one-pipe brake control system embodying means for automatically accommodating said system to operate compatibly with any one of a number of different tractors even if these tractors are preadjusted to maintain different normal charge values of control pipe pressure.

According to these objects, there is provided a simplified trailer brake control system comprising a single control pipe leading from the tractor to the trailer, a control reservoir charged with fluid at substantially the normal charge value of control pipe pressure, and a single brake controlling valve device controlled by control reservoir pressure acting in opposition to control pipe pressure and the pressure existing in the brake actuators; said valve device being responsive to service reductions in control pipe pressure effected by the operator on the tractor to supply fluid from a supply reservoir to the brake actuators at a pressure dependent upon the extent of such reduction, and responsive to subsequent increases in control pipe pressure to effect reductions in brake actuator pressure of a degree corresponding substantially to the extent of such increase. The system also comprises an equalizing or relief valve which is normally closed but is automatically opened by said valve device upon venting of the control pipe for connecting the control reservoir to the supply reservoir so that control reservoir pressure will be reduced by equalization into the supply reservoir which is then connected to the brake actuators, to not only provide a somewhat higher degree of brake application but also reduce control reservoir pressure a chosen amount. If venting of the control pipe occurred as a result of separation of the trailer from the tractor, the reduction in control reservoir pressure by said chosen amount will assure that fluid pressure brakes on the trailer can be fully released even if the trailer should be coupled to another tractor preset to maintain a somewhat lower normal charge value of control pipe pressure than the setting of the former tractor.

Other objects and advantages will become apparent from the following more detailed description of the invention and from the accompanying drawing, wherein the single figure is a diagrammatic view of a brake control system embodying the invention.

Description

As shown in the drawing and according to the invention, there are provided, on each trailer equipped with the improved brake control system, a control pipe 1 which constitutes the only fluid-conveying brake control pipe connectable to an automotive tractor, and in which pipe fluid pressure is normally controlled from the tractor by operator-controlled valve means (not shown); a supply reservoir 2 charged with pressure fluid from the control pipe such as via a choke 3 and a check valve 4; and a brake controlling valve device 5 controlled, in the manner presently to be described, according to variations in control pipe pressure relative to a datum fluid pressure in a control reservoir 6, for controlling the pressure of fluid in a conventional fluid pressure controlled brake actuator 7 for each wheel (not shown).

Valve device 5 comprises two coaxially arranged movable abutments, preferably in the form of diaphragm pistons 8, 9 of different effective areas, reciprocably mounted in a sectionalized casing. The larger piston 8 has at one side a chamber 10 connected via a pipe 11 to control reservoir 6, and has at the opposite side a chamber 12 connected to a branch of control pipe 1. When pressure of fluid in chamber 12 exceeds that in chamber 10 by a slight degree, such as about ¼ p.s.i., piston 8 is adapted to shift and, through abutting contact with a fluted valve stem 12 of a charging valve 14, operatively unseat the latter against resistance of a heavy bias spring 15 to cause pressure fluid to flow from a branch of control pipe 1 via a charging choke 16 to chamber 10 and thereby charge the control reservoir 6 to substantially the normal charge value of control pipe pressure at the rate controlled by said choke; said charging valve normally being held seated by said spring for preventing such flow.

Smaller piston 9 has at one side an atmospheric chamber 17 separated by a casing partition 18 from chamber 12, and at the opposite side is subject to the combined pressures of a light helical bias spring 19 and of fluid in a chamber 20 that is connected to flexible hoses or conduits 21 leading to respective pressure chambers of each brake actuator 7. Coaxially connected to piston 9 is a piston rod 23 that projects sealingly through casing partition 18 and is abuttable by piston 8. Movement of rod 23 is limited by contact of a flange 24 on said rod with the chamber 17 side of casing partition 18 so that the force of spring 19 will not be operatively transmitted to piston 8 and cause undesired unseating of valve 14.

Arranged coaxially with and above the pistons 8, 9 is a valve member 25 preferably of the balanced valve type comprising a cylindrical portion 26 sealingly reciprocable within an aligned bore 27 in the casing and joined at its lower and upper ends to cylindrical portions 28, 29, respectively, which are of equal diameter but of smaller diameter than portion 26. Formed integrally with the lower end of portion 26 is a tapered annular rib defining a supply valve 30 that controls connection of chamber 20 with a chamber 31 that is open via a passage 32 to supply reservoir 2. Valve 30 is seatable against an annular valve seat 33 through which lower portion 28 projects with substantial radial clearance into chamber 20. Formed integrally with the lower end of portion 28 is a tapered annular rib defining a release valve 34 that controls connection of chamber 20 with atmospheric chamber 17. Valve 34 is seatable against an annular valve seat 35 that is carried by piston 9 and encircles one end of a passageway 36 leading through the piston rod 23 to chamber 17.

At its end remote from chamber 31, bore 27 is joined by a shoulder to an aligned smaller bore 37 in which upper portion 29 of valve member 25 is sealingly reciprocable; and a helical spring 38, which encircles portion 29 and is disposed in a chamber 39, bears against said shoulder and acts on valve member 25 for normally biasing supply valve 30 into contact with its seat 33. Since chamber 39 is constantly connected to chamber 20 via a passageway 40 through portion 26 of valve member 25, the latter is of the pressure balanced type because fluid at the same pressure will always act on the equal upper and lower annular areas of portion 26, and atmospheric pressure will always act on the equal cross-sectional areas of lower portion 28 and upper portion 29, portion 29 being subject to atmospheric pressure in an atmospheric chamber 41.

Arranged coaxially with and above valve member 25 is a tapered relief or equalizing valve 42 contained in a chamber 43 open via a branch of pipe 11 to control reservoir 6. Valve 42 controls connection of chamber 43 with a chamber 44 constantly open to supply reservoir passage 32, and is normally biased by a strong helical spring 45 into contact with a tapered annular seat formed in a casing partititon 46 separating said chambers. Equalizing valve 42 has a valve stem 47 comprising a fluted portion that extends through partition 46 and chamber 44 and an unfluted portion that projects sealingly through a casing partition 48 from chamber 44 into chamber 41, so that upper portion 29 of valve member 25 may through abutting contact with said stem operatively unseat the equalizing valve under conditions presently to be described.

*Operation*

Assume initially that the brake system is devoid of pressure fluid. Under this condition, all components will be in the respective positions in which they are shown in the drawing.

To initially charge this system, the control pipe 1 on the trailer is connected to the control pipe (not shown) on a tractor; and the control pipe on the tractor and hence on the trailer is charged with fluid at a predetermined normal charge value of pressure by way of an operator's pedally or manually controlled brake valve in a brake release position to which said brake valve is preferably spring biased.

On the trailer, some of the pressure fluid supplied to the control pipe 1 will flow via chamber 12, choke 3 and check valve 4 to supply reservoir 2 for charging the latter. Meanwhile, when control pipe pressure in chamber 12 exceeds that in chamber 10 by the aforementioned illustrative ¼ p.s.i., piston 8 will be shifted into contact with the end wall of chamber 10 and through stem 13 operatively unseat charging valve 14 against resistance of spring 15; whereupon pressure fluid will flow from control pipe 1 via choke 16 and past valve 14 to chamber 10 for charging the control reservoir 6 until control reservoir pressure builds up to within said ¼ p.s.i. of control pipe pressure and enables valve 14 to be reseated by spring 15.

Meanwhile, supply valve 30 will be maintained seated by the pressure of spring 38 on valve member 25; piston 9 will be maintained biased by spring 19 to a lowermost position, defined by contact of flange 24 with partition 18, and in which position release valve seat 35 is retracted out of contact with release valve 34 for effectively unseating the latter; and equalizing valve 42 will be maintained seated by spring 45.

Hence, at completion of initial charging, all components will once again be in the respective positions in which they are shown in the drawing.

To effect a service application of brakes, the operator at the tractor effects a reduction in control pipe pressure from normal charge value to a selectable lower value corresponding to the degree of brake application desired. Meanwhile, as soon as control pipe pressure in chamber 12 of device 5 on the trailer reduces a slight degree (as determined by the light bias effect of spring 19) below control reservoir pressure in chamber 10, the latter pressure will shift piston 8 upward far enough to shift piston 9 upward, through the medium of rod 23, against resistance of said spring. As piston 9 moves upward, seat 35 will be moved into contact with release valve 34 for effectively seating the latter and thus cutting off the brake actuator conduits 21 from atmosphere, and then valve member 25 will be shifted upward, through the medium of the seated release valve, for unseating supply valve 30 against resistance of light spring 38, thereby defining a service application position of the piston stack 9, 23, 8. Pressure fluid will thereupon flow from supply reservoir 2 via chamber 31 past unseated supply valve 30 to chamber 20 and the brake actuators 7, until brake actuator pressure has increased to a value where it and spring 19 exert a sufficient force on piston 9 to move the latter downward against resistance of the upward force corresponding to the fluid pressure differential across piston 8; whereupon the piston stack 9, 23, 8 will be shifted to a lap position, in which supply valve 30 is seated by spring 38 and release valve 34 is engaged by seat 35, for thereby bottling up pressure fluid in chamber 20 and the brake actuators 7 at a pressure corresponding substantially to the extent control pipe pressure has been reduced below control reservoir pressure.

Each brake actuator 7 may be of the conventional type comprising a diaphragm piston (not shown) subject opposingly to pressure of fluid in conduit 21 and a spring bias pressure; said piston having a piston rod 49 that acts to rock a lever 50, and thereby a cam 51 rotatably connected to said lever, about a pivot 52 a degree corresponding to the pressure of fluid provided in conduit 21, so as thereby through such cam apply to the associated brake shoes (not shown) a braking force proportionate to the pressure provided in conduit 21.

If control pipe pressure is thereafter further reduced, the piston stack 9, 23, 8 will be shifted to service application position and then lap position for providing in the brake actuators 7 fluid at a higher pressure corresponding to this further reduced value of control pipe pressure.

To partially release brakes, control pipe pressure is increased by the operator at the tractor to some value corresponding to the reduced brake actuator pressure desired. As control pipe pressure in chamber 12 increases, piston 8 and hence the stack 8, 23, 9 will move downward to a brake release position in which supply valve 30 remains seated and release valve 34 is effectively unseated. Pressure fluid will then be released from the brake actuators 7 via chamber 20, unseated valve 34, passageway 36 and atmospheric chamber 17 until brake actuator pressure is reduced to a lesser value corresponding to the reduced fluid pressure differential across piston 8, whereupon the stack 8, 23, 9 will be shifted upward and returned to its previously defined lap position for bottling up brake actuator pressure at said lesser value. If, however, control pipe pressure is restored to its normal charge value, it will be apparent that the stack 8, 23, 9 will move to and remain in its brake release position for completely venting the brake actuators 7 and hence completely releasing brakes.

If control pipe pressure is reduced a predetermined degree, such as 20 p.s.i., below normal charge value, the stack 8, 23, 9 will move to and remain in its brake application position for permitting supply reservoir pressure to equalize into the brake actuators 7 via the then unseated supply valve 30, for effecting a so-called full service application of brakes; said predetermined degree being dependent upon the selected ratios in effective areas of pistons 8, 9 and the volume of supply reservoir 2 relative to the volume of the chamber 20, conduits 21 and the pressure chambers of the actuators 7.

It is to be noted that spring 45 is strong enough to hold equalizing valve 42 seated unless control pipe pressure is reduced a chosen amount, such as 5 p.s.i., below said predetermined degree or, in other words, is reduced at least 25 p.s.i. below normal charge value. Hence, if control pipe 1 is vented due to undesired pull apart or intentional uncoupling of the trailer from the tractor or by the operator to effect an emergency application of trailer brakes, a sufficient fluid pressure differential will be developed across stack 8, 23, 9 to cause the latter, through contact of valve member 25 with stem 47, promptly to operatively unseat equalizing valve 42 against the force of spring 45; whereupon pressure fluid will flow from the control reservoir 6 and chamber 10 via pipe 11 and unseated valve 42 and along fluted stem 47 to chamber 44 and thence to supply reservoir 2, with the result that control reservoir pressure will equalize into the supply reservoir 2 and the brake actuators 7 (which are then, as in full service position, connected to reservoir 2 via unseated supply valve 30). This equalization will not only cause a somewhat higher pressure to be provided in the brake actuators 7 for effecting an emergency brake application of greater degree than obtained during a full service application but will also cause a certain reduction, of such as about 10 p.s.i., in control reservoir pressure for reasons now to be explained.

Assume now that the venting of the control pipe 1 occurred as a result of uncoupling the trailer from one tractor that had a reducing valve (not shown) set to provide one normal charge value of control pipe pressure when the aforementioned operator-controlled brake valve is in brake release position, and that said trailer is later coupled to another tractor whose reducing valve is set to provide a somewhat lower normal charge value of control pipe pressure. Under this condition, full release of trailer brakes will be assured upon recharging of the control pipe 1 because fluid cannot and will not be trapped in the control reservoir 6 at a pressure higher than such lower normal charge value of control pipe pressure in view of the previous automatic reduction in control reservoir pressure to the still lower value effected as a result of the unseating of equalizing valve 42. Unless the equalizing valve 42 is provided, it will be obvious that under the condition just assumed the control reservoir 6 will have to be bled manually to assure that pressure will not be trapped in the control reservoir 6 at a higher pressure than the new, lower normal charge value of control pipe pressure; otherwise brakes may not fully release.

It will be noted that brake actuator pressure will automatically be maintained against reasonable leakage during a service application of brakes, so long as the leakage rate does not exceed the flow rate through choke 3, because pressure fluid may flow from the control pipe 1 via choke 3 and check valve 4 to the supply reservoir 2 and thence under control of valve device 5 to the brake actuators 7.

The pistons 8, 9 are preferably of different effective areas so that for each p.s.i. increment of change in control pipe pressure, a greater increment of change (such as say 2.5 p.s.i.) in brake actuator pressure will be effected. If desired, however, the pistons 8, 9 may be of the same area, in which case a 1 p.s.i. change in control pipe pressure would effect a like change in brake actuator pressure.

It will also be apparent that the type of charging control arrangement herein disclosed for the control reservoir 6 is preferable to assure that control reservoir pressure will be only slightly less than the normal charge value of control pipe pressure. If preferred, however, the control reservoir 6 may be charged directly from the control pipe 1 via a check valve in the same manner as the supply reservoir 2, or the control reservoir may be charged to precise equality with control pipe pressure by way of a separate normally open charging valve which is closed when brake actuator pressure exceeds a slight value, such as about 1 or 2 p.s.i.

Spring 19 is preferably provided to assure that the release valve 34 will always be unseated when the control pipe 1 is charged to its normal charge value so that no pressure fluid can be trapped in the brake actuators 7 and cause undesirable brake shoe wear. However, if desired, spring 19 may be eliminated, in which case the flange 24 may likewise be eliminated because the latter is no longer required to prevent transmission of the bias force of spring 19 to piston 8. If the feature whereby charging of the control reservoir 6 is mechanically controlled by the piston 8 is not desired, it will be apparent that flange 24 may be eliminated, whether or not spring 19 is employed.

Having now described the invention, what I claim as new and desire to secure by Letters Patent is:

1. A fluid pressure brake system comprising a normally charged control pipe, a normally charged supply reservoir, a control reservoir normally containing fluid at substantially the normal charge value of control pipe pressure, a fluid pressure controlled brake actuator, valve device controlled by control reservoir pressure acting in opposition to control pipe pressure and brake actuator pressure and responsive to variations of control pipe pressure within a predetermined range relative to control reservoir pressure to supply pressure fluid from the supply reservoir to or release pressure fluid from the brake actuator as necessary to provide in the latter fluid at a pressure corresponding substantially to the magnitude of the differential between control pipe pressure and control reservoir pressure, a normally closed valve operative when opened to connect the control reservoir to the supply reservoir for providing a maximum brake actuator pressure and also effecting a limited degree of reduction in control reservoir pressure, and means operatively connecting said valve device and said valve and being responsive when control pipe pressure is reduced beyond said range for causing said valve to be operatively opened by said valve device.

2. A fluid pressure brake control system comprising a normally charged control pipe in which pressure of fluid is reduced for causing a brake application and increased for causing a release of such application; a normally charged supply reservoir; normally vented fluid pressure operable brake actuator means; a control reservoir; a valve device comprising a plurality of independently movable cooperably connected movable abutments operable as a stack subject to control reservoir pressure acting in opposition to control pipe pressure and pressure of fluid in the brake actuator means, valve mechanism controlled by the stack and including a supply valve controlling connection of the supply reservoir with the brake actuator means and a release valve controlling connection of the brake actuator means with a vent communication, said stack being responsive to a reduction in control pipe pressure below control reservoir pressure to open said supply valve as necessary for providing in the brake actuator means fluid at a pressure substantially proportionate to the extent of such reduction, and responsive to a subsequent increase in control pipe pressure to open said release valve as necessary to effect a reduction in pressure in said brake actuator means of a degree corresponding substantially to the extent of such increase, and a normally closed equalizing valve controlling connection of the control reservoir with the supply reservoir, said stack being responsive to venting of the control pipe to successively effect closure of the release valve, opening of the supply valve and then, through shifting of said valve mechanism in excess of a predetermined amount, operatively effect opening of said equalizing valve for causing pressures of fluid in both the supply reservoir and control reservoir to equalize into the brake actuator means so as to cause fluid at a maximum pressure to be provided in the latter and also effect a chosen limited reduction in control reservoir pressure.

3. A single-pipe type fluid pressure brake system for controlling brakes on an automotive trailer from an automotive tractor, said system comprising a normally charged control pipe providing the sole brake-controlling fluid-conveying communication between the trailer and tractor, pressure of fluid in the control pipe being selectably controllable by an operator on the tractor, a supply reservoir and a control reservoir both normally charged with pressure fluid from the control pipe to substantially the normal charge value of control pipe pressure, normally venter brake actuator means for effecting a brake application of a degree corresponding to the pressure of fluid supplied thereto, and a brake controlling valve device comprising two independently movable cooperably connected movable abutments operable as a stack subject to control reservoir pressure acting in opposition to control pipe pressure and pressure of fluid in the brake actuator means, a normally open release valve and a normally closed supply valve cooperably connected to each other and controlling connection of the brake actuator means with a vent and with the supply reservoir respectively, and a normally closed equalizing valve controlling connection of the control reservoir with the supply reservoir; said stack being operative responsively to a reduction in control pipe pressure of not exceeding a predetermined degree below control reservoir pressure to an application position in which said equalizing valve and release valve are closed and said supply valve is opened, and operative when pressure in the brake actuator means attains a value corresponding substantially to the extent of such reduction to an intermediate lap position in which all of said valves are concurrently closed, and operative responsively to a subsequent increase in control pipe pressure to a release position in which said equalizing valve and supply valve are closed and said release valve is opened for causing brake actuator pressure to be reduced a degree corresponding to the extent of such increase, said stack being operative responsively to a reduction in control pipe pressure in excess of said predetermined degree to move beyond said application position to an emergency position in which said release valve is closed and said supply valve and equalizing valve are opened for thereby causing fluid in both the supply reservoir and control reservoir to equalize into the brake actuator means to provide fluid at a maximum pressure in the latter and also effect a chosen reduction in control reservoir pressure.

4. A system according to claim 3, wherein the supply reservoir is charged from the control pipe at a restricted rate via a check valve and choke, and charging of the control reservoir is controlled by a normally closed charging valve that is operatively opened by one of said movable abutments only when control pipe pressure exceeds control reservoir pressure by a preselected slight degree.

5. A fluid pressure brake system comprising a normally charged control pipe, a normally charged supply reservoir, a control reservoir normally containing fluid at substantially the normal charge value of control pipe pressure, a fluid pressure controlled brake actuator, a valve device comprising a plurality of independently movable cooperably connected movable abutments operable as a stack subject to control reservoir pressure acting in opposition to control pipe pressure and pressure of fluid in the brake actuator, valve mechanism controlled by the stack and including a supply valve controlling connection of the supply reservoir with the brake actuator and a release valve controlling connection of the brake actuator with a constantly open vent communication, said stack being responsive to a reduction in control pipe pressure below control reservoir pressure to open said supply valve as necessary for providing in the brake actuator fluid at a pressure substantially proportionate to the extent of such reduction, and responsive to a subsequent increase in control pipe pressure to open said release valve as necessary to effect a reduction in pressure in said brake actuator of a degree corresponding substantially to the extent of such increase, characterized in that said supply valve and release valve are positively connected to each other and seatable in the same direction, said supply valve being seatable against a fixed seat and said release valve being seatable against a movable seat provided by one of said movable abutments which one movable abutment is exposed to pressure in the brake actuator opposing atmospheric pressure provided by said constantly open vent communication.

6. A fluid pressure brake system comprising a normally charged control pipe, a normally charged supply reservoir, a control reservoir normally containing fluid at substantially the normal charge value of control pipe pressure, a fluid pressure controlled brake actuator, a valve device comprising a plurality of independently movable cooperably connected movable abutments operable as a stack subject to control reservoir pressure acting in opposition to control pipe pressure and pressure of fluid in the brake actuator means, valve mechanism controlled by the stack and including a supply valve controlling connection of the supply reservoir with the brake actuator and a release valve controlling connection of the brake actuator with a vent communication, said stack being responsive to a reduction in control pipe pressure below control reservoir pressure to open said supply valve as necessary for providing in the brake actuator fluid at a pressure substantially proportionate to the extent of such reduction, and responsive to a subsequent increase in control pipe pressure to open said release valve as necessary to effect a reduction in pressure in said brake actuator of a degree corresponding substantially to the extent of such increase, characterized in that said valve mechanism comprises a reciprocable valve member having a cylindrical portion to opposite ends of which are positively connected reduced diameter portion of equal cross-sectional area, said release valve being defined by an annular rib formed at the remote end of one of said reduced diameter portions and seatable against an annular seat carried by one of said movable abutments in surrounding relation to a vent passageway extending through said one movable abutment and in part defining said vent communication, said supply valve being defined by an annular rib formed at the end of said cylindrical portion adjacent said one portion and seatable against an immovable seat encircling said one portion with substantial radial clearance, the other of said reduced diameter portions being subject at its remote end to atmospheric pressure, said cylindrical portion having a passageway therethrough whereby the opposite annular end areas of said cylindrical portion are subjected to fluid at the same pressure, whereby said valve member will be pressure balanced because the opposite annular areas of said cylindrical portion are subjected to the same pressure and the reduced diameter portions are subjected to atmospheric pressure.

7. A system according to claim 6, including an equalizing valve controlling connection of the control reservoir with the supply reservoir, a heavy spring for normally maintaining said equalizing valve closed, an equalizing valve stem abuttably engageable by said remote end of said other portion of said valve member, said stack being responsive to venting of the control pipe to exert a sufficient thrust force via said valve member and valve stem on said equalizing valve to unseat the latter and thereby effect a limited reduction in control reservoir pressure and a maximum brake actuator pressure.

8. A fluid pressure brake system comprising a normally charged pipe, a control reservoir normally containing fluid at substantially the normal charge value of pressure in said pipe, fluid pressure controlled brake applying means, valve means including a supply valve and a release valve controlling connection of said brake applying means respectively with a source of pressure fluid and with a release communication, motor means for said valve means having respective chambers connected to the control reservoir, pipe and brake applying means, said motor means being responsive to variations in pipe pressure within a predetermined range relative to control reservoir pressure to open the supply valve or release valve as necessary to provide in said brake applying means fluid at a pressure corresponding to the magnitude of the differential between pipe pressure and control reservoir pressure, a normally closed relief valve controlling release of pressure fluid from the control reservoir, and means providing an operative connection between said relief valve and motor means for causing the latter to operatively open said relief valve responsively to a reduction in pipe pressure to a value beyond said range.

9. A system according to claim 8, including a charging valve controlling connection of said pipe with said control reservoir, means normally maintaining said charging valve closed, and means operatively connecting said motor means with said charging valve for opening the latter when pressure in said pipe exceeds control reservoir pressure by a slight degree.

10. A fluid pressure brake system of the type comprising a valve device controlled by pressure of fluid in a normally charged control pipe acting in opposition to pressure of fluid in a control reservoir normally containing fluid at substantially the normal charge value of control pipe pressure and to pressure of fluid in a fluid pressure controlled braking means, said valve device being responsive to a reduction in control pipe pressure of not exceeding a predetermined amount relative to control reservoir pressure to provide in said braking means fluid at a pressure corresponding to such reduction, characterized by the provision of a relief communication including a relief valve via which pressure fluid may be released from the control reservoir, means normally maintaining said relief valve closed for closing said relief communication, and means providing an operative connection between the valve device and relief valve for causing said relief valve to be operatively opened by the valve device upon a reduction in control pipe pressure in excess of said predetermined amount relative to control reservoir pressure.

11. A system according to claim 10, wherein said relief communication leads to said braking means.

12. In a fluid pressure brake system of the type wherein pressure of fluid in a fluid pressure controlled brake applying means is controlled according to the extent pressure of fluid in a control pipe is reduced below the pressure of fluid normally bottled up in a control reservoir, the combination of a relief valve controlling release of pressure fluid from the control reservoir, means normally maintaining said relief valve closed, and motor means including means subject to the pressures of fluid in the control pipe and in the brake applying means acting jointly in opposition to control reservoir pressure and operatively connected to said relief valve to cause said relief valve to be opened upon a reduction in control pipe pressure below control reservoir pressure of a substantial degree which is greater than the degree of reduction effected to obtain a full service application of brakes.

References Cited in the file of this patent
UNITED STATES PATENTS
1,832,393    Hildebrand _____ Nov. 17, 1931
FOREIGN PATENTS
353,024    Great Britain _____ July 17, 1931